United States Patent
Niu et al.

(10) Patent No.: US 12,192,923 B2
(45) Date of Patent: Jan. 7, 2025

(54) SYNCHRONIZATION SIGNAL BLOCK TRANSMISSION WITH 480 kHz OR 960 kHz SUBCARRIER SPACING

(71) Applicant: APPLE INC., Cupertino, CA (US)

(72) Inventors: Huaning Niu, San Jose, CA (US); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 398 days.

(21) Appl. No.: 17/441,794

(22) PCT Filed: Jan. 14, 2021

(86) PCT No.: PCT/CN2021/071905
§ 371 (c)(1),
(2) Date: Sep. 22, 2021

(87) PCT Pub. No.: WO2022/151251
PCT Pub. Date: Jul. 21, 2022

(65) Prior Publication Data
US 2023/0096755 A1    Mar. 30, 2023

(51) Int. Cl.
*H04W 56/00* (2009.01)
*H04L 27/26* (2006.01)

(52) U.S. Cl.
CPC ..... *H04W 56/001* (2013.01); *H04L 27/26025* (2021.01)

(58) Field of Classification Search
CPC .......... H04W 56/001; H04L 27/26025; H04L 27/2613; H04L 5/0048; H04L 27/2666
See application file for complete search history.

(56) References Cited

U.S. PATENT DOCUMENTS

2019/0306924 A1* 10/2019 Zhang .................... H04B 7/063
2020/0154341 A1*  5/2020 Sun ........................ H04L 5/0053
(Continued)

FOREIGN PATENT DOCUMENTS

| CN | 111669238 | 9/2020 |
| WO | 2020034517 | 2/2020 |
| WO | WO-2022082767 A1 * | 4/2022 |

OTHER PUBLICATIONS

CATT, Draft Feature lead summary on AI 7.2.4.3 #2 Sidelink synchronization mechanism, 3GPP TSG RAN WG1 #100bis, R1-200xxxx, e-Meeting, Apr. 20-30, 2020.*
(Continued)

*Primary Examiner* — Un C Cho
*Assistant Examiner* — Lalita W Pace
(74) *Attorney, Agent, or Firm* — Kilpatrick Townsend & Stockton LLP

(57) ABSTRACT

The present application relates to devices and components including apparatus, systems, and methods of scheduling transmission of synchronization signal blocks (SSBs) at a subcarrier spacing (SCS) of 480 or 960 kHz.

10 Claims, 18 Drawing Sheets

1400 transmitting, with an SCS of 480 or 960 kHz, a first plurality of SSBs on a first set of consecutive symbols and a second plurality of SSBs on a second set of consecutive symbols
1404 receiving, between the transmission of the first plurality of SSBs and the transmission of the second plurality of SSBs, an uplink data transmission using a 960 kHz SCS
1408

(56) References Cited

U.S. PATENT DOCUMENTS

| | | | | |
|---|---|---|---|---|
| 2020/0154446 | A1* | 5/2020 | Yerramalli | H04W 56/001 |
| 2020/0322949 | A1* | 10/2020 | Akkarakaran | H04B 7/0695 |
| 2021/0050986 | A1* | 2/2021 | Manolakos | H04L 5/0005 |
| 2021/0160036 | A1* | 5/2021 | Reddy | H04L 5/0094 |
| 2021/0175985 | A1* | 6/2021 | Yoon | H04W 56/00 |
| 2021/0258902 | A1* | 8/2021 | Gao | H04L 5/0048 |
| 2021/0329579 | A1* | 10/2021 | Sakhnini | H04W 56/0015 |
| 2022/0150851 | A1* | 5/2022 | Tian | H04L 5/0051 |
| 2022/0210798 | A1* | 6/2022 | Tsai | H04L 5/0094 |
| 2023/0262677 | A1* | 8/2023 | Zhou | H04W 72/046 370/329 |

OTHER PUBLICATIONS

International Preliminary Report on Patentability issued in PCT Application No. PCT/CN2021/071905, dated Jul. 27, 2023 in 6 pages.
Article entitled: "Required Changes to NR Using Existing DL/UL NR Waveform", Nokia, 3GPP TSG RAN WG1 #102-e R1-2006907, dated Aug. 17-Aug. 19, 2020 in 27 pages.
Article entitled: "Required Changes to NR Using Existing DL/UL NR Waveform", Nokia, 3GPP TSG RAN WG1 #103 R1-2007926, Nov. 13, 2020, 41 pages.
International Search Report and Written Opinion issued in PCT Application No. Application No. PCT/CN2021/071905, dated Oct. 12, 2021 in 12 pages.
Invitation to Pay Additional Fees and Where Applicable Protest Fee issued in PCT Application No. PCT/CN2021/071905, dated May 19, 2021 in 2 pages.
ETSI; Harmonised European Standard; entitled, Wideband Data Transmission Systems (WDTS) for Fixed Network Radio Equipment operating in the 57 GHz to 71 GHz band; Harmonised Standard for access to radio spectrum Draft ETSI EN 303 722 V1.1.0; Reference DEN/BRAN-230025; Keywords 60 GHZ, access, broadband, fixed networks, radio, SRD; (Jul. 2021) in 40 pages.
ETSI; Harmonised European Standard; entitled, Wideband Data Transmission System (WDTS) for Fixed Network Radio Equipment operating in the 57-71 GHz band; Harmonised Standard for access to radio spectrum; Reference DEN/BRAN-230025; Keywords 60 GHz; Access; Broadband; Fixed networks; SRD; Radio in 41 pages.
Report and Order; FCC 13-112; Federal Communications Commission; RM-11104; Adopted Aug. 9, 2013 in 32 pages.
Document for: Discussion; entitled, "[103-e-NR-52-71-Waveform-Changes] Discussions Summary #6", Agenda item: 8.2.1; 3 Generation Partnership Project Technical Specification Group-Radio Access Network Working Group 1 Meeting #103-e, Moderator (Intel Corporation), R1-2009718, Oct. 26-Nov. 13, 2020 in 205 pages—Uploaded in Part 1 (1-100 pages) and Part 2 in (1-105 pages)—(2 separate PDFs).
Document for: Discussion and Decision, entitled, "Sidelink Synchronization Mechanism in NR V2X", Agenda Item: 7.2.4.3; 3 Generation Partnership Project Technical Specification Group-Radio Access Network Working Group1 Meeting #99, CATT, R1-1912156, Nov. 18-22, 2019 in 15 pages.
Extended European Search Report issued in European Application No. EP21918459.5, dated Aug. 9, 2024 in 10 pages.

* cited by examiner

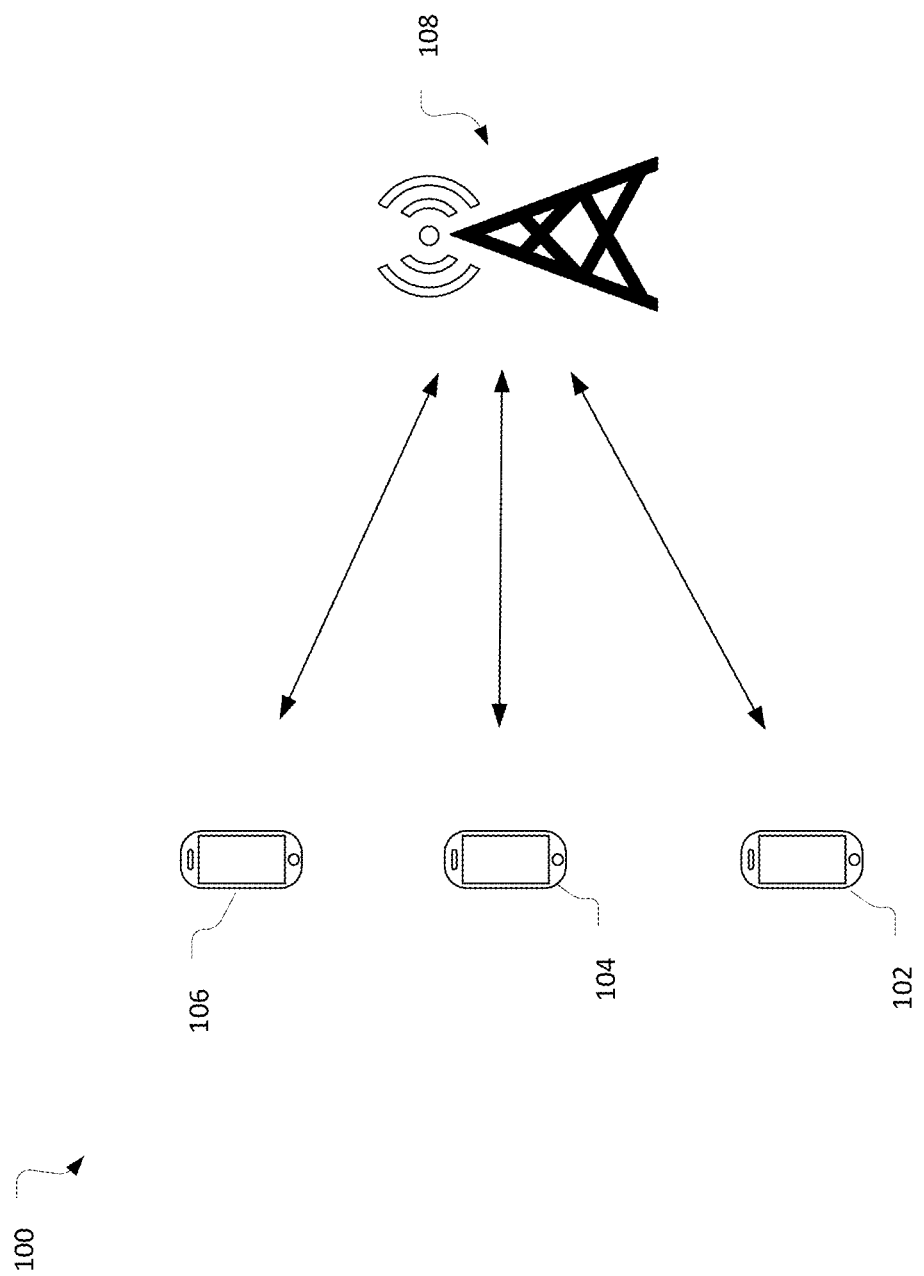

| | EN 302 567 V2.1.20 (2020-06) | FCC 13-112A1 (Indoor/Outdoor) |
|---|---|---|
| Fc Range | 57-71 GHz | 57-71 GHz |
| PSD (eirp) | 23 dBm / MHz | N/A |
| RF output Power | 40 dBm | Indoor: Max avg, 40 dBm avg Max peak, 43 dBm Outdoor Point-to-Point: Max avg, 82-2N dBm Max peak, (85-2N) dBm N = max(0, 51 dBi - GA) |
| Adaptivity (Medium Access Protocol) | LBT Mandatory | No requirements |
| Occupied Channel Bandwidth | at least 70% of the declared Nominal Channel Bandwidth | N/A |
| MCOT | 5 msecs | N/A |
| CCA Threshold | -47 dBm + 10 × log10 (PMax / Pout) | N/A |

Figure 2

| | EN 303 722 v0.0.4 (2020-05) |
|---|---|
| Fc Range | 57-71 GHz |
| PSD (eirp) | Fixed outdoor installations with > 30 dBi transmit antenna gain 38 dBm/MHz otherwise 23 dBm/MHz |
| RF output Power | GA < 13 dBi, max eirp = 27 dBm + GA<br>13 dBi <= GA < 30 dBi, max eirp = 40 dBm<br>30 dBi <= GA (NOT fixed outdoor), max eirp = 40 dBm<br>30 dBi <= GA (fixed outdoor), max eirp = 55 dBm |
| Adaptivity (Medium Access Protocol) | ATPC is mandatory |
| Occupied Channel Bandwidth | < 100 %.; it was agreed during BRAN#105 to replace "between 70% and 100%" with "less than 100%". However, there was no discussion related to the possible value of a lower limit (the 70%) with respect to the use of "nominal channel bandwidth" in clause 4.2.7.2.) |
| MCOT | N/A |
| CCA Threshold | N/A |

```
ServingCellConfigCommonSIB ::=    SEQUENCE {
    ...
    ssb-PositionsInBurst          SEQUENCE {
        inOneGroup                BIT STRING (SIZE (8)),
        groupPresence             BIT STRING (SIZE (8))
        QCLgroup                  BIT STRING (SIZE (8))

Qcl-type                  Type A and Type D          % Defines how many SSBs within one group have
                                                             % the same QCL state
    },
    ssb-periodicityServingCell    ENUMERATED { ms5, ms10, ms20, ms40, ms80, ms160, spare2, spare1 }
}
```

Figure 12

```
ServingCellConfigCommon ::=   SEQUENCE {
    ...
    ssb-PositionsInBurst            CHOICE {
        shortBitmap                     BIT STRING (SIZE (4)),
        mediumBitmap                    BIT STRING (SIZE (8)),
        longBitmap                      BIT STRING (SIZE (64))
        QCLgroup                        BIT STRING (SIZE (64))    % Defines how many SSBs within one group have
                                                                  % the same QCL state Qcl-type                        Type A and Type D
    },
    ssb-periodicityServingCell      ENUMERATED { ms5, ms10, ms20, ms40, ms80, ms160, spare2, spare1 }
    ...
}
```

Figure 13

SYNCHRONIZATION SIGNAL BLOCK TRANSMISSION WITH 480 kHz OR 960 kHz SUBCARRIER SPACING

This application is a 35 U.S.C. § 371 National Stage Entry of International Application No. PCT/CN2021/071905, filed on Jan. 14, 2021, which is incorporated herein by reference in its entirety for all purposes.

BACKGROUND

It may be desired to extend Third Generation Partnership Project (3GPP) Fifth Generation (5G) New Radio (NR) to other frequency bands. Frequencies between 52.6 GHz and 71 GHz may be especially interesting because of, for example, their proximity to sub-52.6 GHz bands of the current NR system.

BRIEF DESCRIPTION OF THE DRAWINGS

FIG. 1 illustrates a network environment in accordance with some embodiments.

FIGS. 2 and 3 show examples of regulatory limitations.

FIG. 6 shows an example of an SSB pattern for an SCS of 480 kHz and an example of an SSB pattern for an SCS of 960 kHz in accordance with some embodiments.

FIG. 7 shows an example of an SSB pattern for an SCS of 480 kHz and an example of an SSB pattern for an SCS of 960 kHz in accordance with some embodiments.

FIG. 8 shows an example of an SSB pattern for an SCS of 480 kHz and an example of an SSB pattern for an SCS of 960 kHz in accordance with some embodiments.

FIG. 11 shows an example of receiving a Primary Synchronization Sequence (PSS) within each of two adjacent and QCLed SSBs in accordance with some embodiments.

FIG. 12 shows an example of a code listing in accordance with some embodiments.

FIG. 13 shows an example of a code listing in accordance with some embodiments.

DETAILED DESCRIPTION

Figure 4:
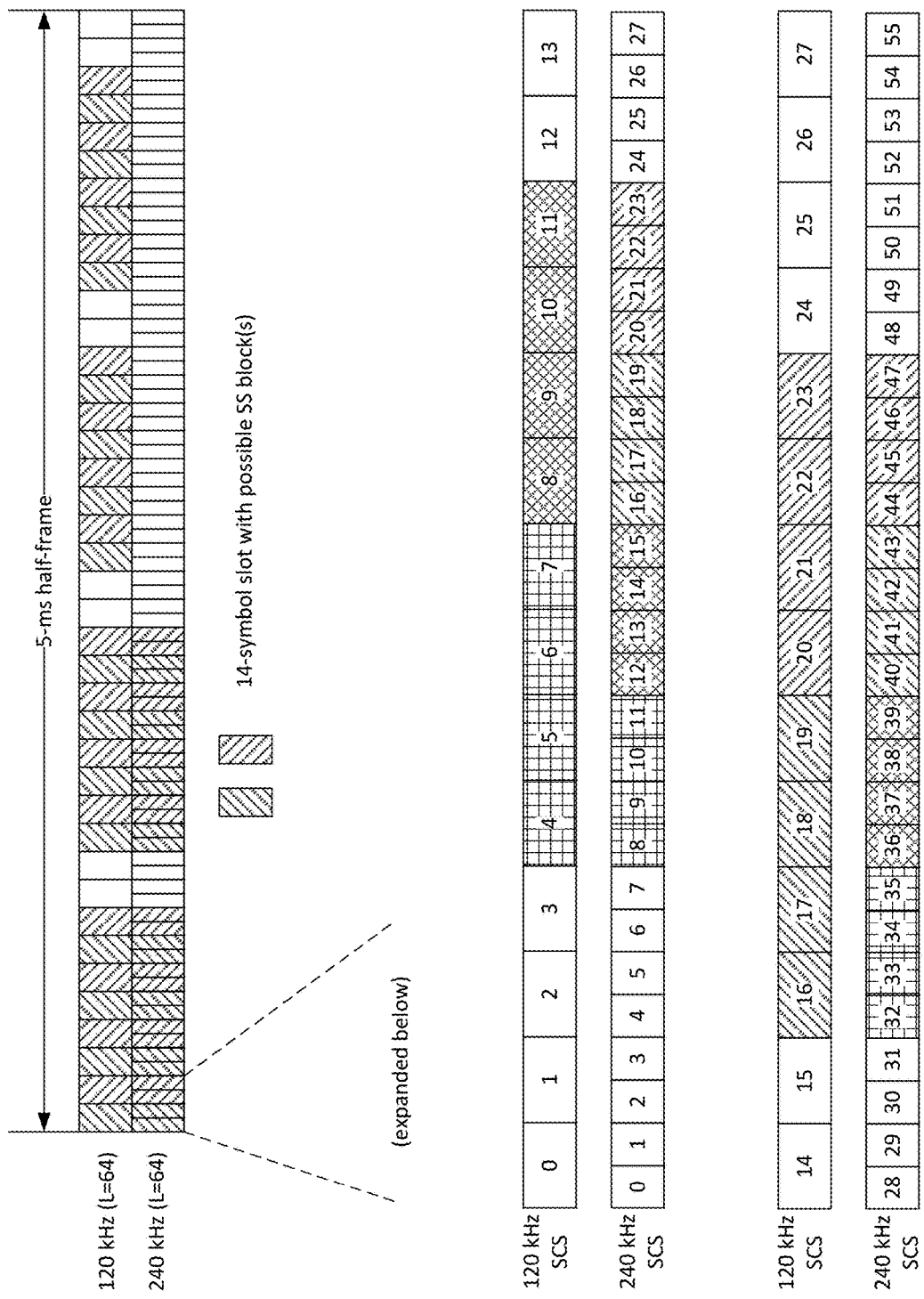
FIG. 4 shows an example of a time-domain mapping of SSBs to slots.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include UEs 102, 104, and 106, and an access node 108. The access node 108 may be a base station that provides one or more wireless access cells, for example, 3GPP New Radio (NR) cells, through which one or more of the UEs 102/104/106 may communicate with the access node 108. In some aspects, the access node 108 is a Next Generation NodeB (gNB) that provides the 3GPP NR cell. The air interfaces over which the UEs 102/104/106 and access node 108 communicate may be compatible with 3GPP technical specifications (TSs) such as those that define Fifth Generation (5G) NR system standards and may occupy frequency bands in Frequency Range 1 (FR1) (e.g., below 7.225 GHz), Frequency Range 2 (FR2) (e.g., 24.250 GHz and above, also called mmWave), or higher frequency bands (e.g., between 52.6 GHz and 71 GHz or 114.25 GHz).

In 5G networks, the downlink carrier may be divided into a number of bandwidth parts (BWPs). Such division may facilitate the efficient provision of services in an environment in which different devices have different channel bandwidth capabilities. The BWP may include a set of contiguous common resource blocks.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UEs 102/104/106 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by a UE 102/104/106 during a cell search procedure and for beam selection.

The PDSCH may be used to transfer end-user application data, signaling radio bearer (SRB) messages, system information messages (other than, for example, a Master Information Block (MIB)), and paging messages.

The access node 108 may use a PDCCH to transmit downlink control information (DCI) to the UEs 102/104/106. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

A PDCCH may be configured by a control resource set (CORESET) that defines a set of resource blocks and number of symbols for the control channel. The access node 108 may transmit the scheduling PDCCHs using resource elements that belong to a control resource set (CORESET). A search space associated with the CORESET may configure the time of the control channel, for example, periodicity, offset, etc. The search space configuration may refer to a particular CORESET to define a search space, for example, a specific set of resource blocks and symbols where the UE 102/104/106 is to attempt to decode the PDCCH. The access node 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and quasi-co-location (QCL) information to support a successful reception of the PDCCH.

A CORESET having an identity zero (CORESET 0) may be configured by a controlResourceSetZero information element within a master information block (MIB) and within a ServingCellConfigCommon parameter structure. CORESET 0 may be associated with an initial downlink BWP.

The initial downlink BWP may be configured by an initialDownlinkBWP parameter transmitted in system information block 1 (SIB 1). The UEs 102/104/106 may use the initial downlink BWP when first accessing a cell provided by the access node 108. The access node 108 may use dedicated signaling to configure up to four additional downlink BWPs per cell.

The PDSCH may be used to transfer application data, signaling radio bearer (SRB) messages, system information and paging messages. Providing reliable PDSCH reception is an objective of a network system design. Such an objective may be especially the case for providing services such as ultra-reliable and low-latency communication (URLLC) service, which is a target use case of NR networks.

The access node (e.g., base station or gNB) 108 may also transmit various reference signals to the UEs 102/104/106. A reference signal is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. A UE 102/104/106 may compare a received version of the DMRS with a known DMRS sequence that was transmitted to estimate an impact of the propagation channel. The UE 102/104/106 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 102/104/106 to determine the desired downlink beam pair for transmitting/receiving physical downlink control channel (PDCCH) and physical downlink shared channel (PDSCH) transmissions The PUCCH may be used to transmit uplink control information (UCI) including, for example, hybrid-automatic repeat request (HARQ) acknowledgements, scheduling requests, and periodic and semi-persistent channel state information (CSI) reports.

The PUSCH may be used to transfer user data in the user plane and signaling radio bearer (SRB) messages in the control plane. The PUSCH may also be used to transfer various control information such as, for example, buffer status reports, cell-radio network temporary identifiers (C-RNTIs), configured grant configuration, and power headroom reports.

It may be desired to extend 5G NR to other frequency bands. For example, NR beyond 52.6 GHz up to 114.25 GHz may be considered. Frequencies between 52.6 GHz and 71 GHz are especially interesting in the short term, because of their proximity to sub-52.6 GHz (current NR system) and imminent commercial opportunities for high data rate communications, e.g., (un)licensed spectrum between 57 GHz and 71 GHz. 5G NR in unlicensed spectrum (NR-U) provides for both license-assisted and standalone use of unlicensed spectrum.

For implementing such extension, it may be desirable to leverage Frequency Range 2 (FR2) design to the extent possible. For example, it may be beneficial to use aspects of existing waveforms (e.g., existing downlink (DL)/uplink (UL) NR waveform) to support operation at frequencies between 52.6 GHz and 71 GHz and beyond if feasible, to take advantage of such opportunities by minimizing specification burden and required changes and maximizing the leverage of FR2-based implementations. Such aspects may include applicable numerology including subcarrier spacing (SCS), channel BW (including maximum), and their impact to FR2 physical layer design to support system functionality considering, for example, practical radio-frequency (RF) impairments; channel access mechanism assuming beam-based operation in order to comply with the regulatory requirements applicable to unlicensed spectrum for frequencies between 52.6 GHz and 71 GHz, etc.

In the physical layer, it may be desired to consider new numerology or numerologies (e.g., $\mu$, value in 3GPP TS 38.211, version 16.3.0, Release 16 (2020-11)) for operation in this frequency range. Impact on physical signals/channels, if any, may also be addressed. For example, timeline-related aspects adapted to each of the new numerologies may be considered (e.g., BWP and beam switching times, HARQ scheduling, UE processing, preparation and computation times for PDSCH, PUSCH/SRS and CSI, respectively). It may be desired to support up to 64 SSB beams for licensed and unlicensed operation in a frequency range between 52.6 GHz and 71 GHz. It may be desired to consider SSB patterns, and multiplexing of SSBs with Control Resource Set (CORESET) and UL transmissions. It may be desired to use a bandwidth part (BWP) that can operate with 480 kHz SCS for data/control/reference signals and 240 kHz SCS for SSB, for example. It may be desired to support contention-exempt short control signaling transmission (e.g., in 60 GHz band) for regions where listen-before-talk (LBT) is required and short control signaling without LBT is allowed.

The current NR release (Release-15 or "R15") design supports SSB transmission at a subcarrier spacing (SCS) of 120 kHz and SSB transmission at an SCS of 240 kHz. For future designs, it may be desired to enable SSB transmission at one or more SCSs higher than 240 kHz. For example, it may be desired to design a pattern for SSB transmission at an SCS of 480 kHz and/or a pattern for SSB transmission at an SCS of 960 kHz. It may be considered that an SSB transmission with SCS higher than 240 kHz tends to have a coverage loss as compared to an SSB transmission with SCS of 120 or 240 kHz. Therefore, it may also be desired to consider issues of coverage enhancement for SSB transmission at an SCS of 480 kHz or 960 kHz.

When considering SSB patterns, it may be desired to consider issues that may include any of the following:
1) Operation in unlicensed spectrum if listen-before-talk (LBT) is required for SSB transmission (e.g., SSB cycling transmission within a DRS (Discovery Reference Signal) transmission window);
2) beam switching time between SSBs;
3) coverage of SSBs;

4) multiplexing of SSB transmissions with CORESET and UL transmissions.

In terms of SSB link budget, SSB transmissions at lower SCSs tend to have better coverage than SSB transmissions at higher SCSs. For example, the MCL (maximum coupling loss) and MIL (maximum insertion loss) difference between transmissions at 120 kHz SCS and transmissions at 480 kHz SCS is about 5 dB, and the MCL and MIL difference between transmissions at 120 kHz SCS and transmissions at 960 KHz SCS is about 8 dB (as indicated in Section 6.1.2 of 3GPP TR 38.808 V1.0.0 (2020-12)).

FIG. 2 shows a diagram of regulatory limitations as indicated in European Telecommunications Standards Institute (ETSI) Harmonized European Standard EN 302 567 V2.1.20 (2020-06) and in Federal Communications Commission (FCC) 13-112A1 (Aug. 9, 2013). For power spectral density or "PSD" (effective isotropic radiated power or "eirp"), EN 302 567 indicates a value of 23 dBm/MHz.

FIG. 3 shows a diagram of regulatory limitations as indicated in European Telecommunications Standards Institute (ETSI) Document Number EN 303 722 v0.0.4 (2020-05). For PSD (eirp), EN 303 722 indicates a value of 38 dBm/MHz that only applies to fixed outdoor installations with >30 dBi transmit (Tx) antenna gain.

In NR (e.g., in section 4.1 of TS 38.213 (V16.3.0, 2020-11)), SSB transmission at SCSs of 120 and 240 kHz is specified for Frequency Range 2 (FR2), with a total maximum of 64 SSBs per SSB burst. For an SCS of 120 kHz, the 64 candidate symbols for the starting symbol of an SSB within a 5-ms half-frame (the symbols of the half-frame being indexed in order of time, the index starting at 0) are indicated by the expression $\{4, 8, 16, 20\}+28\times n$, where n=0, 1, 2, . . . , 18 except for 4, 9, and 14. For an SCS of 240 kHz, the 64 candidate symbols for the starting symbol of an SSB within a 5-ms half-frame (the symbols of the half-frame being indexed in order of time, the index starting at 0) are indicated by the expression $\{8, 12, 16, 20, 32, 36, 40, 44\}+56\times n$, where n=0, 1, 2, . . . , 8 except for 4.

FIG. 4 shows an example of a time-domain mapping of SSBs to symbols of slots of a half-frame. The diagrams at the top of FIG. 4 show the sequences of 14-symbol slots in a 5-ms half-frame for SCSs of 120 kHz (top row) and 240 kHz (bottom row). In these diagrams, slots with possible SSB(s) are shaded, and for both SCSs, the number L of candidate SSBs in a half-frame is 64.

The first two slots of 120 kHz numerology in the diagrams at the top of FIG. 4 (and the corresponding first four slots of 240 kHz numerology) are expanded in the diagrams at the bottom of FIG. 4 to show the component symbols. In these diagrams, the symbols for each numerology are labeled in order of time (starting at an index of 0), and each group of four consecutive symbols that is a candidate for SSB transmission is indicated by shading. As shown in these diagrams, SSBs at 120 kHz SCS in the first two slots of a half-frame may begin at symbols 4, 8, 16, and/or 20, and SSBs at 240 kHz SCS in the first four slots of a half-frame may begin at symbols 8, 12, 16, 20, 32, 36, 40, and/or 44.

The maximum number of SSBs transmitted by an access node within a Discovery Reference Signal (DRS) transmission window may be specified by the value of a parameter Q. For signaling of QCL (Quasi-Co-Location) assumptions among SSB candidates (e.g., in NR-U), the values Q=$\{1, 2, 4, 8\}$ are supported for purposes of SSB QCL derivation. Two bits of the PBCH may be used to signal the value of Q: the 1-bit least-significant-bit (LSB) of k_SSB in the Master Information Block (MIB), and the 1-bit parameter ssbSubcarrierSpacingCommon in MIB. Once the value of Q is known to a UE, the UE may assume that for a cell (either a serving cell or a neighboring cell), a QCL relation exists between SSBs that are within or across DRS transmission or measurement windows that have the same value of modulo (A, Q), where A is the PBCH DMRS sequence index. Such a scheme may reuse the Rel-15 Demodulation Reference Signal (DMRS) sequence of PBCH (e.g., the maximum number of DMRS sequences is eight).

Figure 5:
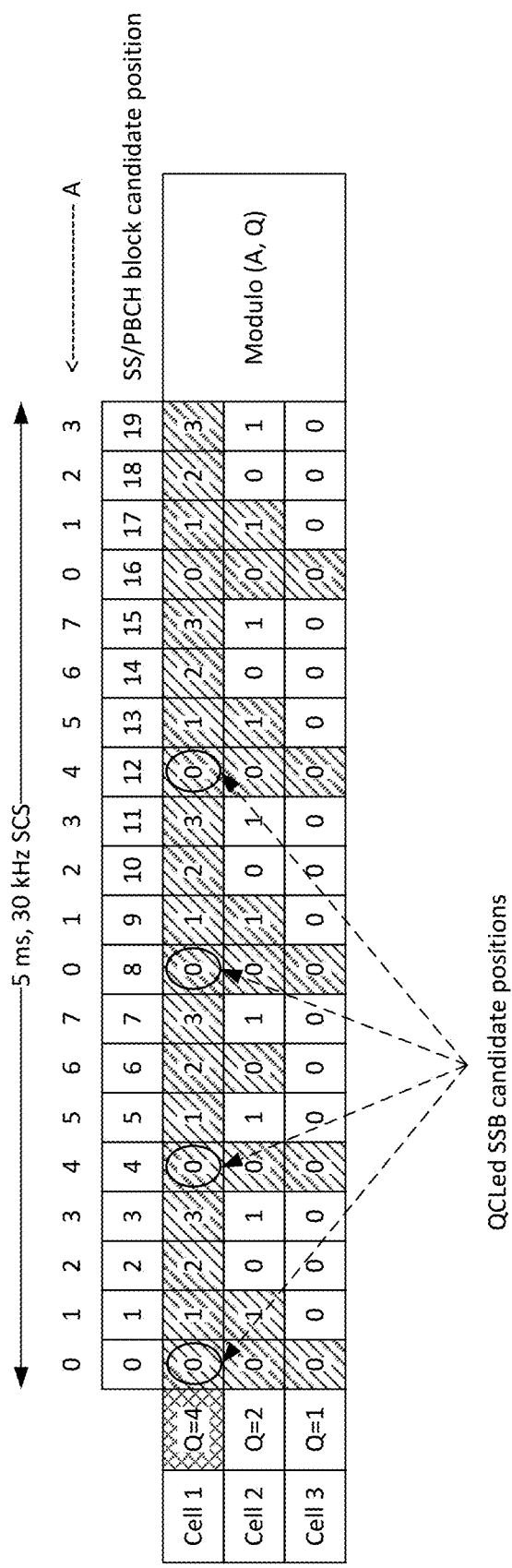
FIG. 5 shows an example of quasi-colocation (QCL) relations among candidate SSBs.

FIG. 5 shows an example of such QCL relations among SSB (SS/PBCH) candidates in a 5-ms window at an SCS of 30 kHz. Each of the SSB candidate positions is labeled in order of time with an index that starts with 0, and the corresponding value of A is also indicated for each of the SSB candidate positions. The values of mod (A,Q) for values of Q=4 (cell 1), Q=2 (cell 2), and Q=1 (cell 3) are also shown, and the resulting QCLed SSB candidate positions are indicated.

An SSB pattern with a SCS of 480 or 960 kHz may be used, for example, in a non-initial access BWP. A potential benefit of SSB transmission using a high SCS is to enhance DL timing when 960 KHz SCS is used for UL data transmission (e.g., to ensure timing accuracy within cyclic prefix (CP) duration).

Figure 6:
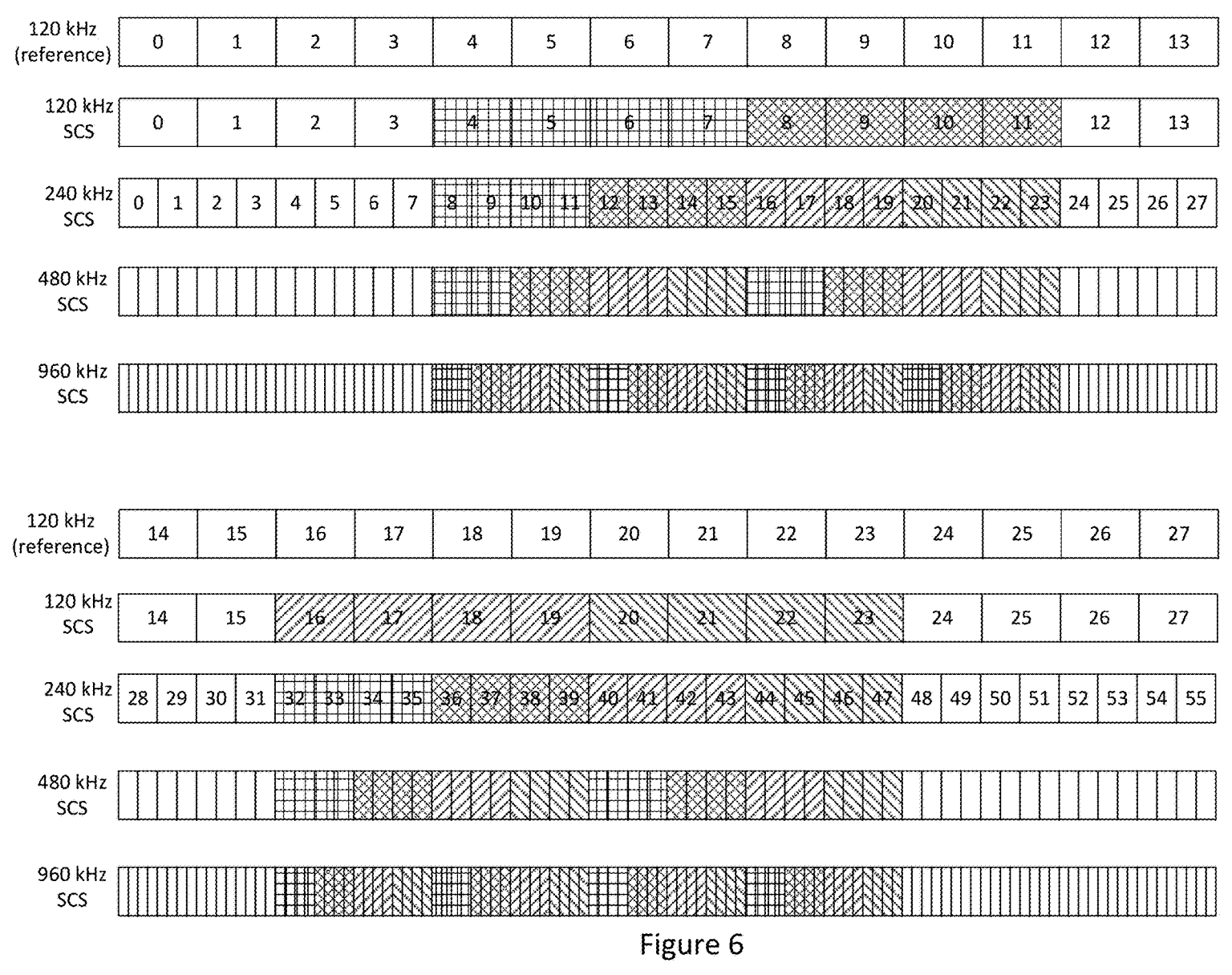

FIG. 6 shows an example of an SSB pattern for an SCS of 480 kHz and an example of an SSB pattern for an SCS of 960 kHz. In this figure, the first two slots of a half-frame for 120 kHz numerology are shown for reference, and the corresponding initial slots for SCSs of 120, 240, 480, and 960 kHz are also shown with candidate SSB positions being shaded. For each SCS, the symbols are labeled in time, starting at an index of 0 (labeling not shown for SCSs of 480 and 960 kHz).

An SSB pattern as shown in FIG. 6 may extend the current design for SSB transmission at 120 kHz SCS (e.g., candidate starting symbols at $\{4, 8, 16, 20\}+28\times n$, where n=0, 1, 2, . . . , 19 except for 4, 9, 14, and 19) or the current design for SSB transmission at 240 kHz SCS (e.g., candidate starting symbols at $\{8, 12, 16, 20, 32, 36, 40, 44\}+56\times n$, where n=0, 1, 2, . . . , 9 except for 4 and 9) to SSB transmissions at an SCS of 480 or 960 kHz, such that the candidate SSB symbols at these higher SCSs occur in the same corresponding absolute time windows as the candidate SSB symbols at the lower SCSs. In this example, the symbols which are candidates for starting an SSB transmission at an SCS of 480 kHz are $\{16, 20, 24, 28, 32, 36, 40, 44\}$ and $\{64, 68, 72, 76, 80, 84, 88, 92\}$, and the symbols which are candidates for starting an SSB transmission at an SCS of 960 kHz are $\{32, 36, 40, 44, 48, 52, 56, 60, 64, 68, 72, 76, 80, 84, 88, 92\}$.

Figure 7:
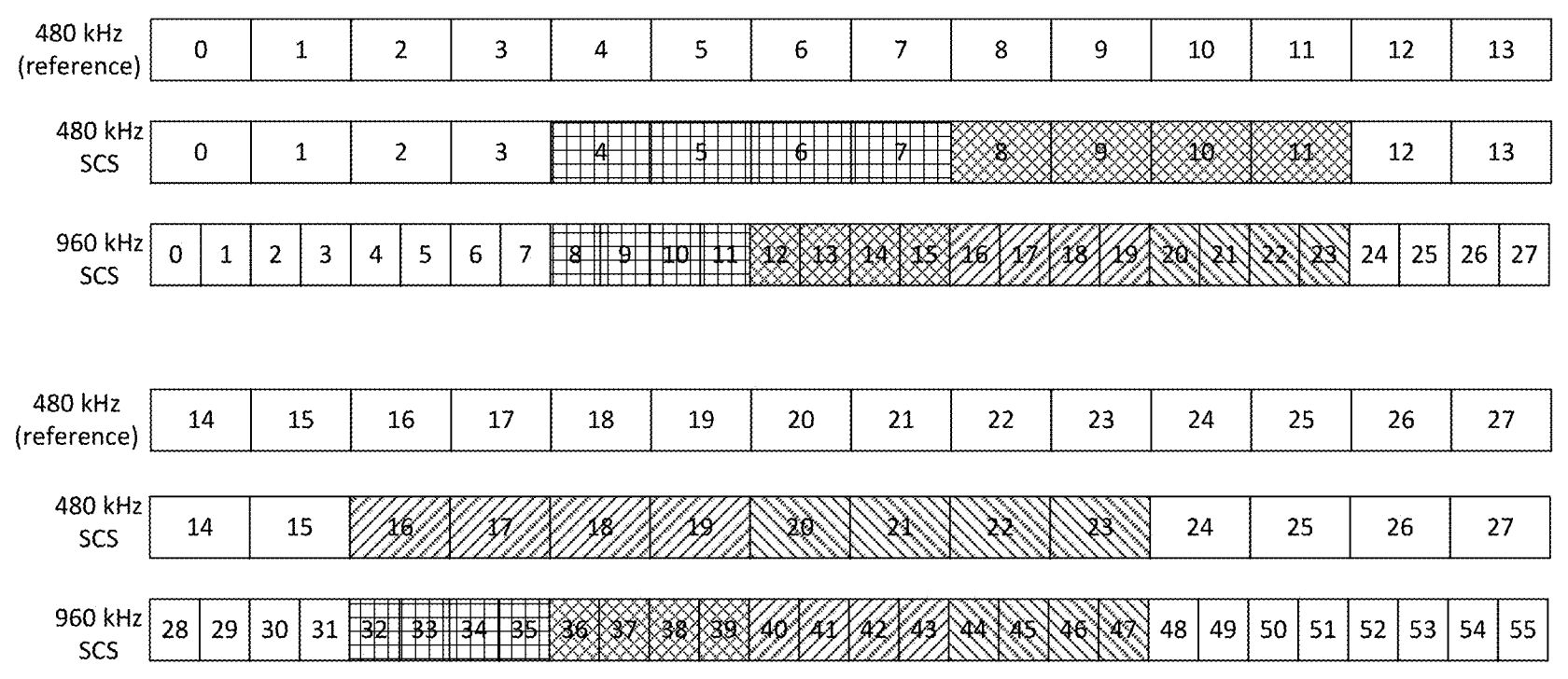

FIG. 7 shows another example of an SSB pattern for an SCS of 480 kHz and another example of an SSB pattern for an SCS of 960 kHz. In this figure, the first two slots of a half-frame for 480 kHz numerology are shown for reference, and the corresponding initial slots for SCSs of 480 and 960 kHz are also shown with candidate SSB positions being shaded. For each SCS, the symbols are labeled in time, starting at an index of 0.

An example pattern as shown in FIG. 7 may extend the current design for SSB transmission at 120 kHz SCS (e.g., candidate starting symbols at $\{4, 8, 16, 20\}+28\times n$, where n=0, 1, 2, . . . , 19 except for 4, 9, 14, and 19) to SSB transmissions at an SCS of 480 kHz and/or may extend the current design for SSB transmission at 240 kHz SCS (e.g., candidate starting symbols at $\{8, 12, 16, 20, 32, 36, 40, 44\}+56\times n$, where n=0, 1, 2, . . . , 9 except for 4 and 9) to SSB transmissions at an SCS of 960 kHz.

Figure 8:
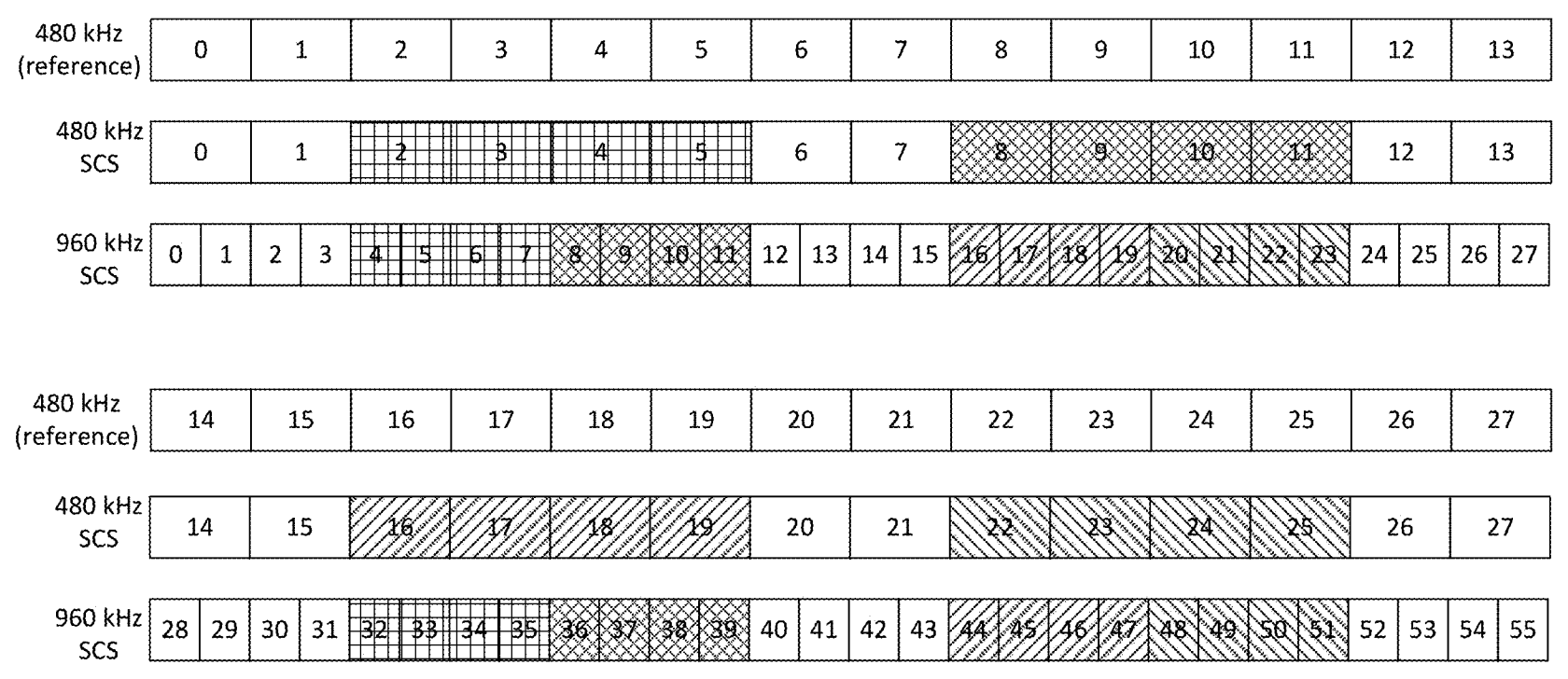

FIG. 8 shows a further example of an SSB pattern for an SCS of 480 kHz and a further example of an SSB pattern for an SCS of 960 kHz. In this figure, the first two slots of a half-frame for 480 kHz numerology are shown for reference, and the corresponding initial slots for SCSs of 480 and 960 kHz are also shown with candidate SSB positions being shaded. For each SCS, the symbols are labeled in time, starting at an index of 0.

An example pattern as shown in FIG. 8 may reuse the current design for SSB transmission at 120 kHz SCS (e.g., candidate starting symbols at {4, 8, 16, 20}+28×n, where n=0, 1, 2, . . . , 19 except for 4, 9, 14, and 19) for SSB transmissions at an SCS of 960 kHz. Additionally or alternatively, such a pattern for an SCS of 960 kHz may be mapped to symbols corresponding in time for an SCS of 480 kHz to obtain a corresponding SSB pattern for an SCS of 480 kHz (e.g., as shown in FIG. 8).

The issue of SSB coverage in >52.6 GHz transmission is considered. For example, SSB transmissions with high SCS may tend to have coverage loss. It is observed that for SSB transmission at an SCS of 240 kHz and a total of 64 SSB per SSB burst, the occupied bandwidth (PBCH) is 20*240*12=57.6 MHz. With 23 dBm/MHz, the max EIRP is achieved. Further extension of the SSB bandwidth may not improve EIRP and may reduce the coverage of SSB instead. With fixed total power, a wider bandwidth may reduce performance (e.g., due to a frequency-selective channel).

It is also observed that, in the European Union (EU), due to EIRP limitation, a maximum EIRP of 40 dBm is allowed. Due to the limit on EIRP, configuring a gNB to transmit a narrower beam may not provide better coverage. For example, with 64 narrow beams, array gain is 10*log 10(64)=18 dBi and Tx power is 22 dBm. It may not be ideal to back-off Tx power of a gNB. Instead, with 16 wider beams, array gain of 10*log 10(16)=12 dBi, and a Tx power of 28 dBm, a UE may combine 4 SSBs together to achieve better coverage. Consequently, a method to improve SSB coverage may include time-domain repetition and combining of SSBs.

To extend the coverage, it may be desired to define an SSB group with a QCL Type A (Doppler shift, Doppler spread, average delay, and delay spread) and a QCL Type D (spatial relationship) to improve SSB coverage performance, particularly for SSB transmissions at 480 KHz or 960 KHz SCS. Such a design may be implemented under an assumption that SSBs are transmitted as short control signaling (e.g., that an SSB burst is transmitted at a fixed location regardless of LBT results, similar to operation in a licensed band).

Figure 9:
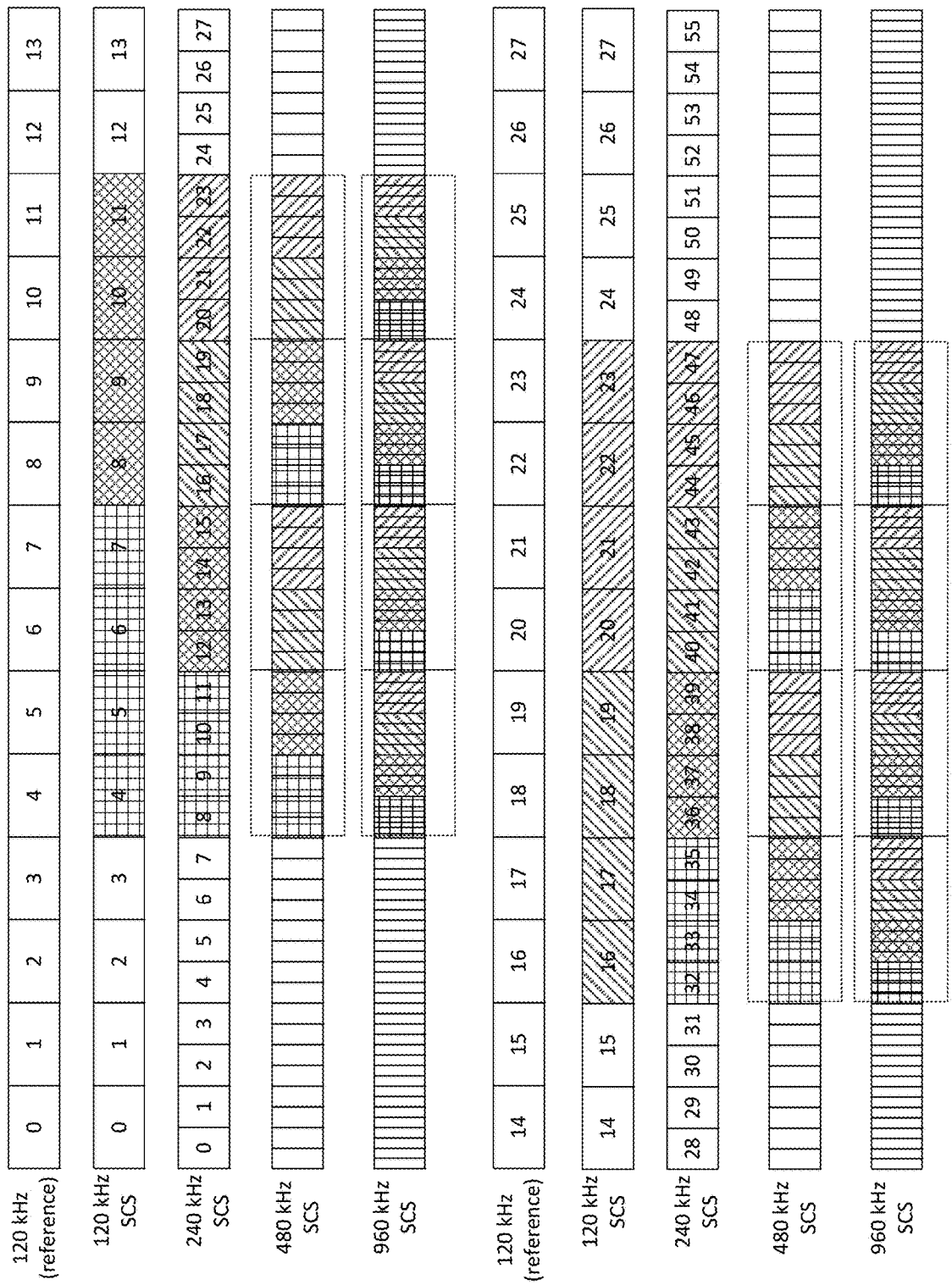
FIG. 9 shows an example of QCL assumptions among SSBs in accordance with some embodiments.

A SSB group with QCL Type A and QCL Type D is considered. FIG. 9 shows an example of such QCL assumptions among SSBs in which an SSB pattern for a 120 kHz/240 kHz SCS design is extended to 480 or 960 kHz SCS as shown in FIG. 6. For 480 kHz SCS, to achieve the same coverage as for 120 kHz SCS and 240 kHz SCS, every two SSBs (as illustrated by the dotted boxes) have the same QCL Type A and QCL Type D. For 960 kHz SCS, to achieve the same coverage as for 120 kHz and 240 kHz SCS, every four SSBs (as illustrated by the dotted boxes) have the same QCL Type A and QCL Type D.

If coverage extension at an SCS of 120 kHz and/or at an SCS of 240 kHz is also desirable, a similar idea can be applied as well. For example, two adjacent SSBs for an SCS of 120 or 240 kHz may share the same QCL Type A and QCL Type D, and for an SCS of 480 kHz/960 kHz, every four/eight SSBs have the same QCL Type A and QCL Type D.

Figure 10:
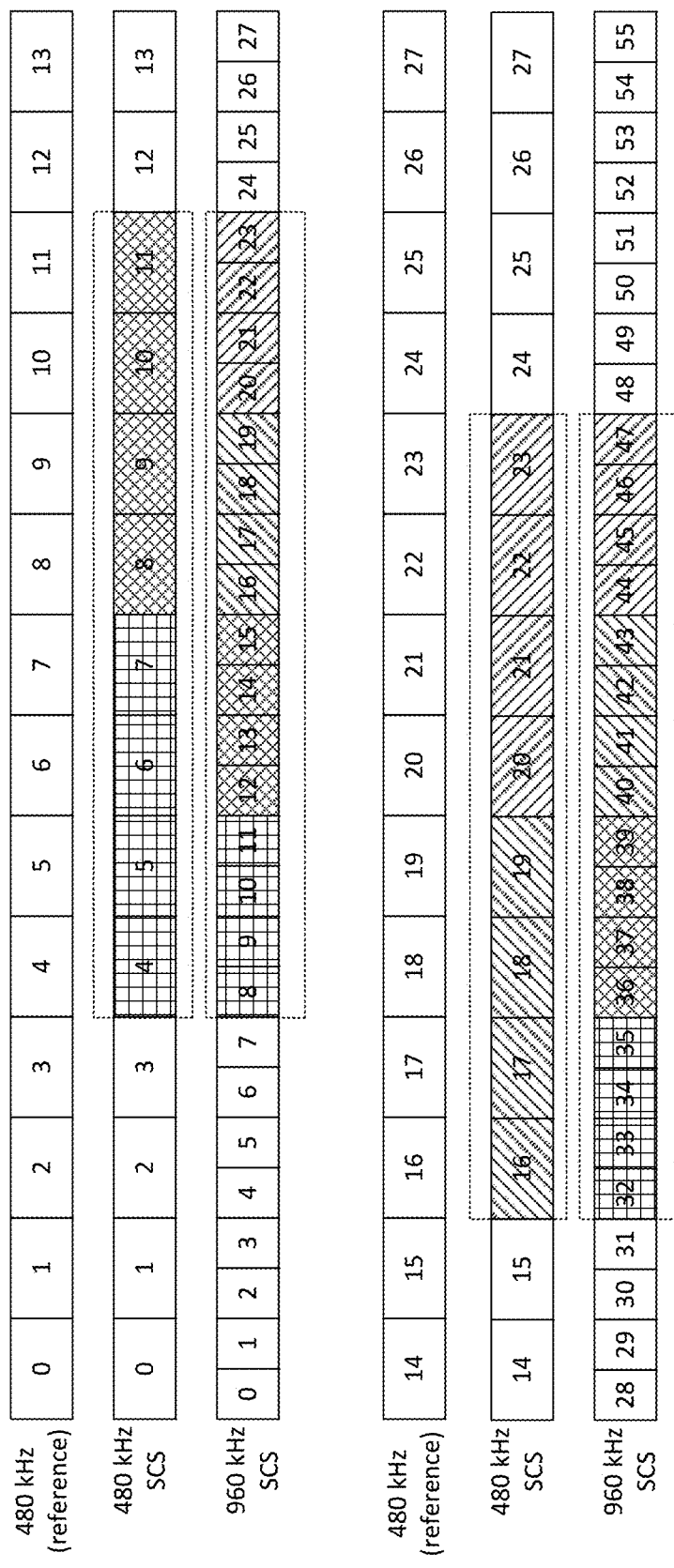
FIG. 10 shows an example of QCL assumptions among SSBs in accordance with some embodiments.

FIG. 10 shows another example of such QCL assumptions among SSBs in which a pattern for SSB transmission at 480 kHz/960 kHz SCS reuses a design for 120 kHz/240 kHz SCS as shown in FIG. 7. For 480 kHz SCS, every two SSBs (as illustrated by the dotted boxes) have the same QCL Type A and QCL Type D. For 960 kHz SCS, every four SSBs (as illustrated by the dotted boxes) have the same QCL Type A and QCL Type D. In this case, beam switching time between SSBs may not be an issue even for 960 kHz SCS.

It may be desired to perform receiver combining across an SSB pattern for 480 kHz/960 kHz SCS. For example, a UE may assume that the SSBs with the same QCL state should be always transmitted if one of them is transmitted. In other words, the actual transmission status for SSBs having the same QCL state should be the same, so that if an SSB with a certain QCL state is transmitted, the other SSBs with the same QCL state are also transmitted.

Figure 11:
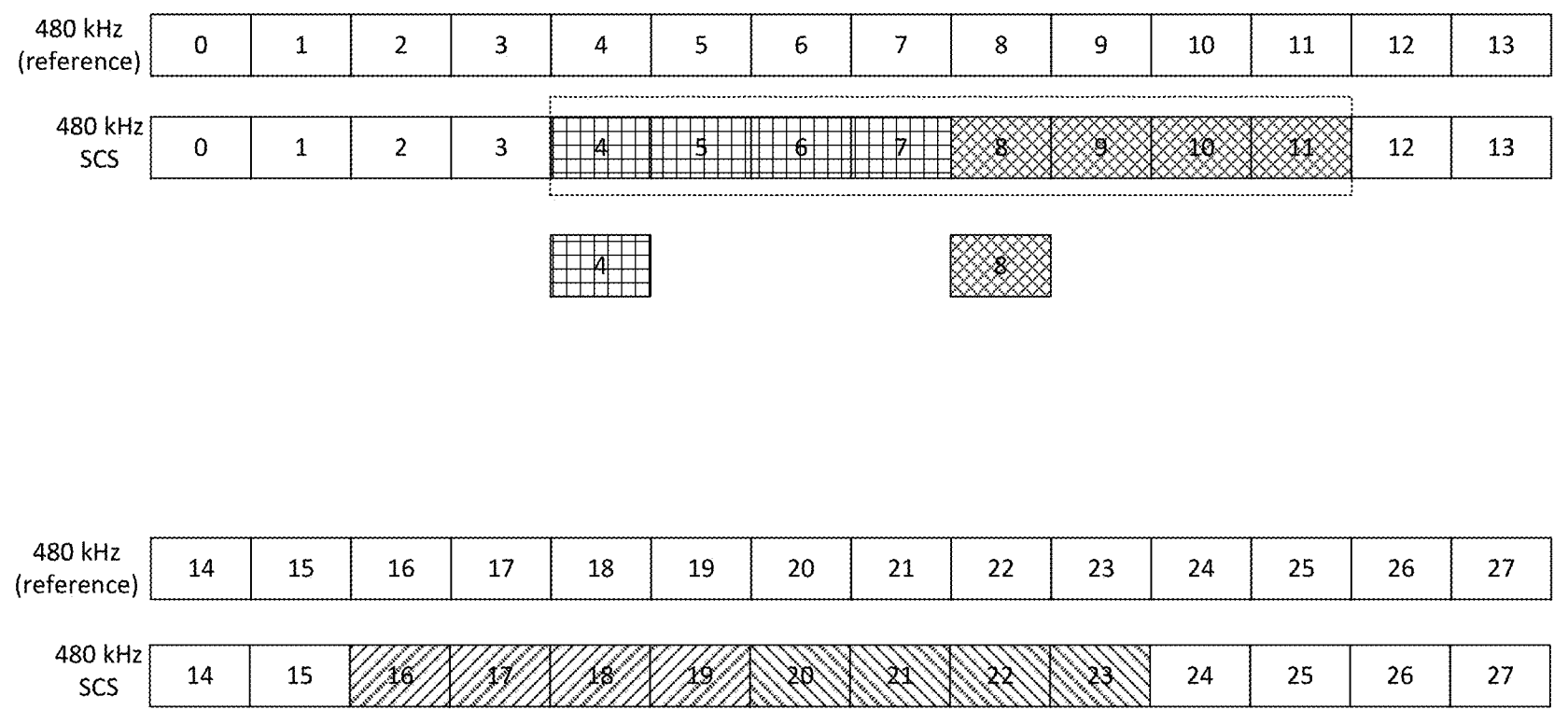

A UE may be configured to perform coherent combining across different QCLed SSBs. FIG. 11 shows an example of receiving a Primary Synchronization Sequence (PSS) within each of two adjacent and QCLed SSBs (with the QCL assumption among the SSBs being indicated by the dotted box). As shown in this example, a UE (e.g., a UE Rx) may be configured to perform local correlation using two PSSs separated by four symbols to perform cross correlation, with the correlation peak being summed before comparing to a threshold value. In a similar manner, the UE (e.g., the UE Rx) may be configured to perform local correlation using two Secondary Synchronization Sequences (SSSs) separated by four symbols to perform cross correlation, with the correlation peak being summed before comparing to a threshold value.

For standalone system signaling of a Transmission Configuration Indicator (TCI) State of an SSB pattern, TCI State information can be added in a parameter such as, for example, a ServingCellConfigCommonSIB Information Element (IE). FIG. 12 shows an example of a code listing of a ServingCellConfigCommonSIB IE in which such information is added (with the added information being indicated by boldface and underlining).

For signaling of a TCI State of an SSB pattern in a non-standalone system, TCI State information may be configured in an LTE anchor or NR FR1/FR2. In such case, TCI State information can be added in a parameter such as, for example, a ServingCellConfigCommon IE. FIG. 13 shows an example of a code listing of a ServingCellConfigCommon IE in which such information is added (with the added information being indicated by boldface and underlining).

Regarding PBCH content and CORESET0 monitoring behavior, for a standalone system, a default value of how many SSBs are QCLed together (e.g., have the same QCL state) can be assumed in the specification for UE initial access. In one example, the range of values for the SSB index still extends from 0 to 63. Alternatively, the SSB indexes of each of the QCLed SSB can be set to the same value. Six bits in the PBCH may be used to signal a combination of SSB index and Q. For example, for 480 kHz SCS, the combination may include values of Lmax=16 and Qmax=4 (where Lmax is the maximum number of different QCL states among the candidate SSBs in a half-frame and Qmax is the maximum number of transmitted SSBs per QCL state).

For monitoring of Control Resource Set 0 (CORESET0) and Search Space 0 (SS0)) instances, if an SSB k is provided in the CORESET0 QCL chain, any of the following options may be used:

Option 1: All CORESET0/SS0 instances associated with the SSBs that share the same QCL with the SSB k should be monitored by the UE.

Option 2: Only the CORESET0/SS0 instance associated with the SSB k should be monitored by the UE.

Option 3: The UE may report its capability to support option 1 or option 2.

Option 4: Whether the UE is to use option 1 or option 2 may be configured by higher layer signaling, e.g. via Radio Resource Control (RRC) and/or Medium Access Control-Control Element (MAC-CE).

By default, option 1 or option 2 may be used.

Figure 14:
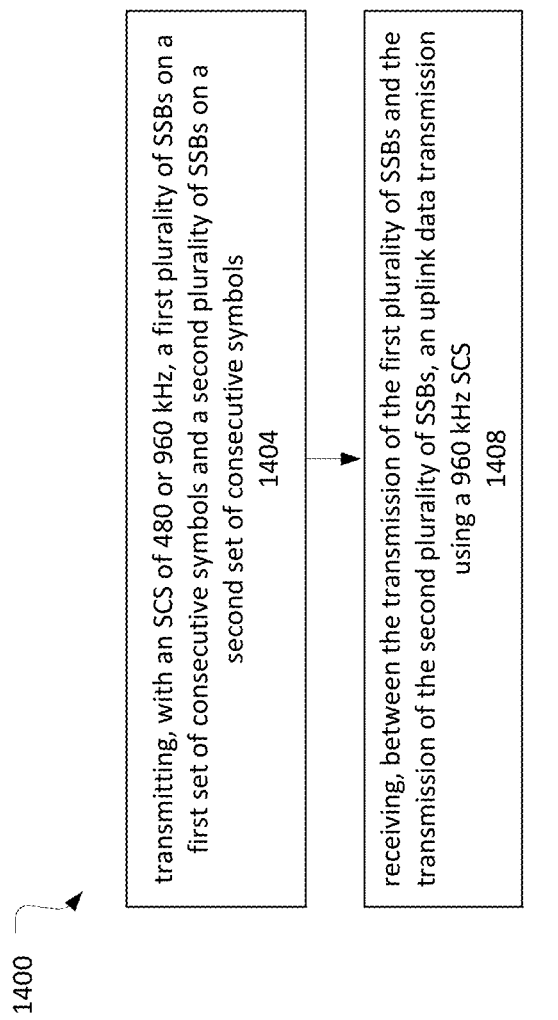
FIG. 14 illustrates an operational flow/algorithmic structure (e.g., as may be performed or implemented by an access node) in accordance with some embodiments.

FIG. 14 illustrates an operational flow/algorithmic structure 1400 in accordance with some embodiments. The operation flow/algorithmic structure 1400 may be performed or implemented by an access node (e.g., a base station and/or gNB) such as, for example, access node 108 or 1800; or components thereof, for example, baseband processor 1804A.

The operation flow/algorithmic structure 1400 may include, at 1404, transmitting, with an SCS of 480 or 960 kHz, a first plurality of SSBs on a first set of consecutive symbols and a second plurality of SSBs on a second set of consecutive symbols. In some aspects, each SSB of the first plurality of SSBs and each SSB of the second plurality of SSBs has a duration of four symbols, and/or the first plurality of SSBs and the second plurality of SSBs occur in a bandwidth part other than an initial downlink bandwidth part.

The operation flow/algorithmic structure 1400 may include, at 1408, receiving, between the transmission of the first plurality of SSBs and the transmission of the second plurality of SSBs, an uplink data transmission using a 960 kHz SCS.

Figure 15:
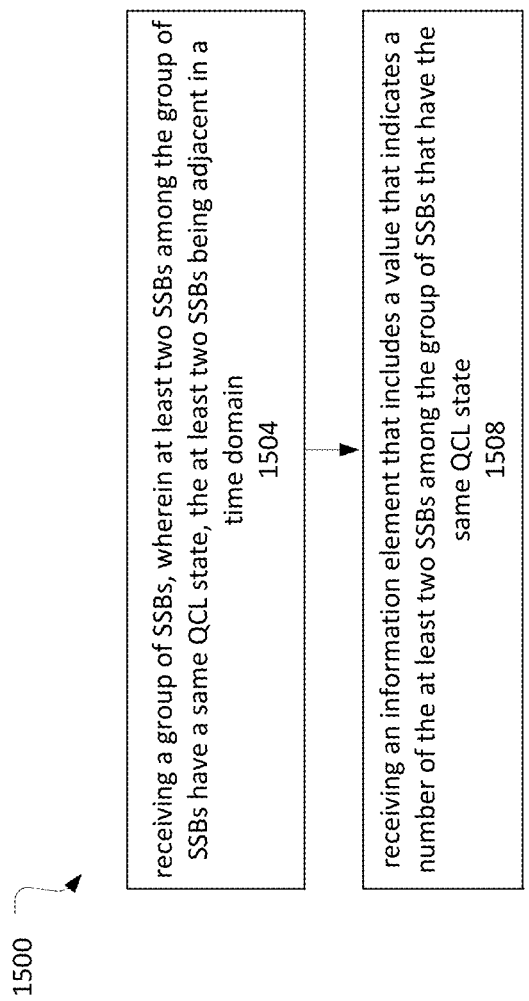
FIG. 15 illustrates an operational flow/algorithmic structure (e.g., as may be performed or implemented by a UE) in accordance with some embodiments.

FIG. 15 illustrates an operational flow/algorithmic structure 1500 in accordance with some embodiments. The operation flow/algorithmic structure 1500 may be performed or implemented by a UE such as, for example, UE 102, 104, 106 or 1700; or components thereof, for example, baseband processor 1704A

The operation flow/algorithmic structure 1500 may include, at 1504, receiving a group of SSBs, wherein at least two SSBs among the group of SSBs have a same QCL state, the at least two SSBs being adjacent in a time domain. In some aspects, each SSB of the first plurality of SSBs and each SSB of the second plurality of SSBs has a duration of four symbols, and/or the first plurality of SSBs and the second plurality of SSBs occur in a bandwidth part other than an initial downlink bandwidth part.

The operation flow/algorithmic structure 1500 may include, at 1508, receiving an information element that includes a value that indicates a number of the at least two SSBs among the group of SSBs that have the same QCL state. In some aspects, the information element is a ServingCellConfigCommonSIB information element or a ServingCellConfigCommon information element.

Figure 16:
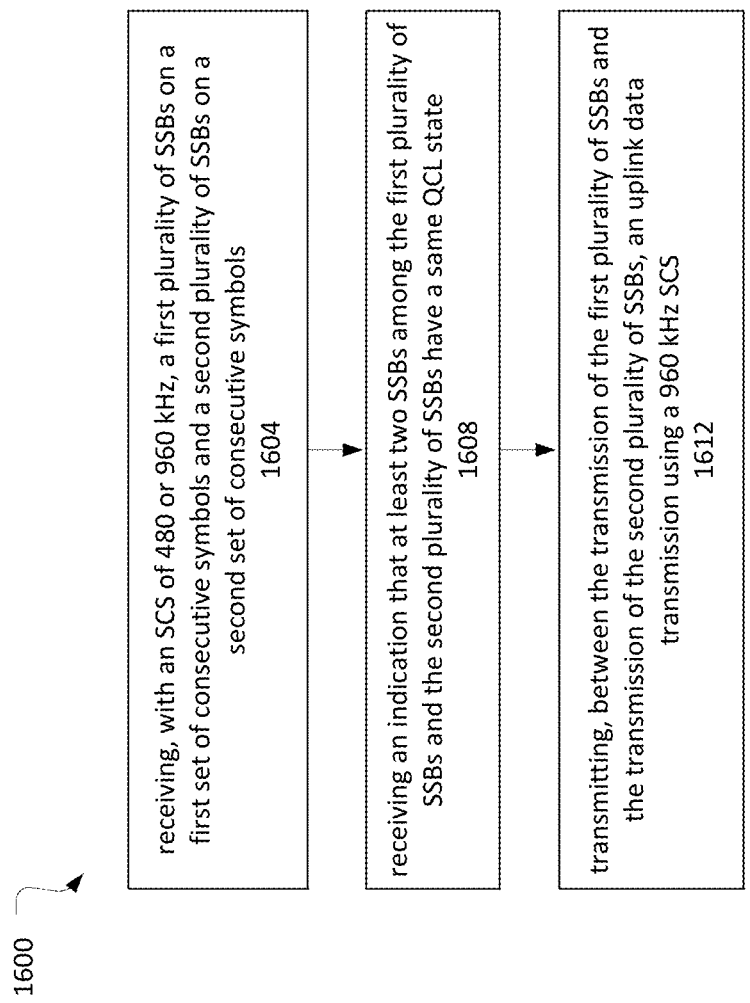
FIG. 16 illustrates an operational flow/algorithmic structure (e.g., as may be performed or implemented by a UE) in accordance with some embodiments.

FIG. 16 illustrates an operational flow/algorithmic structure 1600 in accordance with some embodiments. The operation flow/algorithmic structure 1600 may be performed or implemented by a UE such as, for example, UE 102, 104, 106 or 1700; or components thereof, for example, baseband processor 1704A.

The operation flow/algorithmic structure 1600 may include, at 1604, receiving, with an SCS of 480 or 960 kHz, a first plurality of SSBs on a first set of consecutive symbols and a second plurality of SSBs on a second set of consecutive symbols. In some aspects, the each SSB of the first plurality of SSBs and each SSB of the second plurality of SSBs has a duration of four symbols, and/or the first plurality of SSBs and the second plurality of SSBs occur in a bandwidth part other than an initial downlink bandwidth part.

The operation flow/algorithmic structure 1600 may include, at 1608, receiving an indication that at least two SSBs among the first plurality of SSBs and the second plurality of SSBs have a same QCL state. In some aspects, the same QCL state comprises QCL Type A and QCL Type D.

The operation flow/algorithmic structure 1600 may include, at 1612, transmitting, between the transmission of the first plurality of SSBs and the transmission of the second plurality of SSBs, an uplink data transmission using a 960 kHz SCS.

Figure 17:
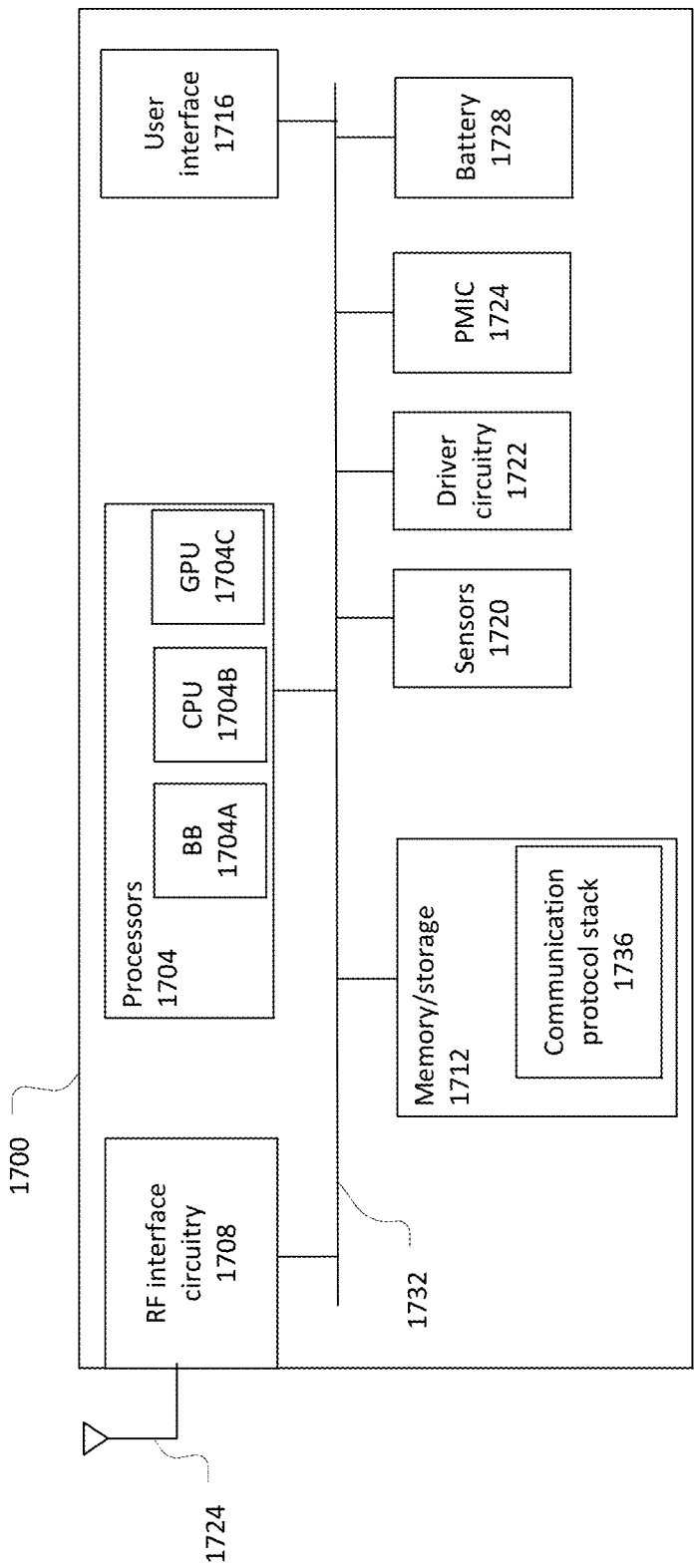
FIG. 17 illustrates a user equipment (UE) in accordance with some embodiments.

FIG. 17 illustrates a UE 1700 in accordance with some embodiments. The UE 1700 may be similar to and substantially interchangeable with UEs 102, 104, or 106.

The UE 1700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1700 may include processors 1704, RF interface circuitry 1708, memory/storage 1712, user interface 1716, sensors 1720, driver circuitry 1722, power management integrated circuit (PMIC) 1724, antenna structure 1726, and battery 1728. The components of the UE 1700 may be implemented as integrated circuits (ICs), portions thereof, discrete electronic devices, or other modules, logic, hardware, software, firmware, or a combination thereof. The block diagram of FIG. 17 is intended to show a high-level view of some of the components of the UE 1700. However, some of the components shown may be omitted, additional components may be present, and different arrangement of the components shown may occur in other implementations.

The components of the UE 1700 may be coupled with various other components over one or more interconnects 1732, which may represent any type of interface, input/output, bus (local, system, or expansion), transmission line, trace, optical connection, etc. that allows various circuit components (on common or different chips or chipsets) to interact with one another.

The processors 1704 may include processor circuitry such as, for example, baseband processor circuitry (BB) 1704A, central processor unit circuitry (CPU) 1704B, and graphics processor unit circuitry (GPU) 1704C. The processors 1704 may include any type of circuitry or processor circuitry that executes or otherwise operates computer-executable instructions, such as program code, software modules, or functional processes from memory/storage 1712 to cause the UE 1700 to perform operations as described herein.

In some embodiments, the baseband processor circuitry 1704A may access a communication protocol stack 1736 in the memory/storage 1712 to communicate over a 3GPP compatible network. In general, the baseband processor circuitry 1704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1708.

The baseband processor circuitry 1704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1712 may include one or more non-transitory, computer-readable media that includes instructions (for example, communication protocol stack 1736) that may be executed by one or more of the processors 1704 to cause the UE 1700 to perform various operations described herein. The memory/storage 1712 may also store CSI IMR, reporting, and rate pattern configuration information as described elsewhere.

The memory/storage 1712 include any type of volatile or non-volatile memory that may be distributed throughout the UE 1700. In some embodiments, some of the memory/storage 1712 may be located on the processors 1704 themselves (for example, L1 and L2 cache), while other memory/storage 1712 is external to the processors 1704 but accessible thereto via a memory interface. The memory/storage 1712 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1708 may include transceiver circuitry and radio frequency front module (RFEM) that allows the UE 1700 to communicate with other devices over a radio access network. The RF interface circuitry 1708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1726 and proceed to filter and amplify (with a low-noise amplifier) the signal. The signal may be provided to a receiver of the transceiver that down-converts the RF signal into a baseband signal that is provided to the baseband processor of the processors 1704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1726.

In various embodiments, the RF interface circuitry 1708 may be configured to transmit/receive signals in a manner compatible with NR access technologies.

The antenna 1726 may include antenna elements to convert electrical signals into radio waves to travel through the air and to convert received radio waves into electrical signals. The antenna elements may be arranged into one or more antenna panels. The antenna 1726 may have antenna panels that are omnidirectional, directional, or a combination thereof to enable beamforming and multiple input, multiple output communications. The antenna 1726 may include microstrip antennas, printed antennas fabricated on the surface of one or more printed circuit boards, patch antennas, phased array antennas, etc. The antenna 1726 may have one or more panels designed for specific frequency bands including bands in FR1 or FR2.

The user interface circuitry 1716 includes various input/output (I/O) devices designed to enable user interaction with the UE 1700. The user interface 1716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1700.

The sensors 1720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors;

barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1722 may include software and hardware elements that operate to control particular devices that are embedded in the UE 1700, attached to the UE 1700, or otherwise communicatively coupled with the UE 1700. The driver circuitry 1722 may include individual drivers allowing other components to interact with or control various input/output (I/O) devices that may be present within, or connected to, the UE 1700. For example, driver circuitry 1722 may include a display driver to control and allow access to a display device, a touchscreen driver to control and allow access to a touchscreen interface, sensor drivers to obtain sensor readings of sensor circuitry 1720 and control and allow access to sensor circuitry 1720, drivers to obtain actuator positions of electro-mechanic components or control and allow access to the electro-mechanic components, a camera driver to control and allow access to an embedded image capture device, audio drivers to control and allow access to one or more audio devices.

The PMIC 1724 may manage power provided to various components of the UE 1700. In particular, with respect to the processors 1704, the PMIC 1724 may control power-source selection, voltage scaling, battery charging, or DC-to-DC conversion.

A battery 1728 may power the UE 1700, although in some examples the UE 1700 may be mounted deployed in a fixed location, and may have a power supply coupled to an electrical grid. The battery 1728 may be a lithium ion battery, a metal-air battery, such as a zinc-air battery, an aluminum-air battery, a lithium-air battery, and the like. In some implementations, such as in vehicle-based applications, the battery 1728 may be a typical lead-acid automotive battery.

Figure 18:
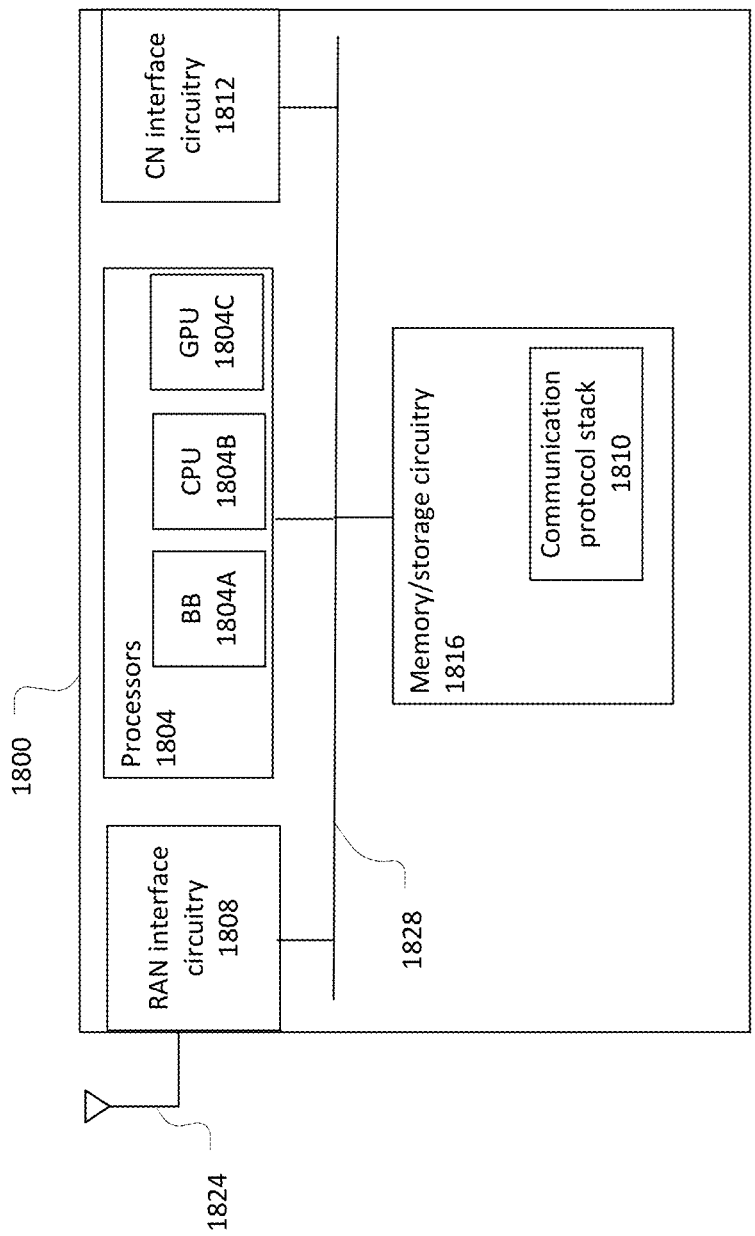
FIG. 18 illustrates an access node (e.g., a base station and/or gNB) in accordance with some embodiments.

FIG. 18 illustrates an access node (e.g., a base station and/or gNB) 1800 in accordance with some embodiments. The access node 1800 may be similar to and substantially interchangeable with access node 108.

The access node 1800 may include processors 1804, RF interface circuitry 1808, core network (CN) interface circuitry 1812, memory/storage circuitry 1816, and antenna structure 1826.

The components of the access node 1800 may be coupled with various other components over one or more interconnects 1828.

The processors 1804, RF interface circuitry 1808, memory/storage circuitry 1816 (including communication protocol stack 1810), antenna structure 1826, and interconnects 1828 may be similar to like-named elements shown and described with respect to FIG. 17.

The CN interface circuitry 1812 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 1800 via a fiber optic or wireless backhaul. The CN interface circuitry 1812 may include one or more dedicated processors or FPGAs to communicate using one or more of the aforementioned protocols. In some implementations, the CN interface circuitry 1812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating an access node (e.g., a base station and/or gNB), comprising transmitting, with a subcarrier spacing of 480 or 960 kHz, a first plurality of SSBs on a first set of consecutive symbols and a second plurality of SSBs on a second set of consecutive symbols; and receiving, between the transmission of the first plurality of SSBs and the transmission of the second plurality of SSBs, an uplink data transmission using a 960 kHz SCS.

Example 2 includes the method of example 1 or some other example herein, wherein each SSB of the first plurality of SSBs and each SSB of the second plurality of SSBs has a duration of four symbols.

Example 3 includes the method of example 1 or some other example herein, wherein the first plurality of SSBs and the second plurality of SSBs occur in a bandwidth part other than an initial downlink bandwidth part.

Example 4 includes the method of example 1 or some other example herein, wherein the transmission of the first plurality of SSBs and the transmission of the second plurality of SSBs occur within an ordered time sequence of R consecutive symbols, and wherein R has a value of (112×P), where P has a value of (S/480) and each symbol in the ordered time sequence is indexed from 0 to (R−1), and wherein, for each SSB of the first plurality of SSBs, an index Y1 of a starting symbol of the SSB has a value of the following expression: Y1=(16×P)+(4×m), and wherein, for each SSB of the second plurality of SSBs, an index Y2 of a starting symbol of the SSB has a value of the following expression: Y2=(64×P)+(4×m), where m is any integer from 0 to [(8×P)−1].

Example 5 includes the method of example 1 or some other example herein, wherein the transmission of the first plurality of SSBs and the transmission of the second plurality of SSBs occur within an ordered time sequence of R consecutive symbols, and wherein R has a value of (28×P), where P has a value of (S/480) and each symbol in the ordered time sequence is indexed from 0 to (R−1), and wherein, for each SSB of the first plurality of SSBs, an index Y1 of a starting symbol of the SSB has a value of the following expression: Y1=(4×P)+(4×m), and wherein, for each SSB of the second plurality of SSBs, an index Y2 of a starting symbol of the SSB has a value of the following expression: Y2=(16×P)+(4×m), where m is any integer from 0 to [(2×P)−1].

Example 6 includes the method of example 1 or some other example herein, wherein the transmission of the first plurality of SSBs and the transmission of the second plurality of SSBs occur within an ordered time sequence of R consecutive symbols, and wherein R has a value of (28×P), where P has a value of (S/480) and each symbol in the ordered time sequence is indexed from 0 to (R−1), and wherein, for each SSB of the first plurality of SSBs, an index Y1 of a starting symbol of the SSB has a value of the following expression: Y1=[(2×P)+(4×m)] or [(8×P)+(4×m)], and wherein, for each SSB of the second plurality of SSBs, an index Y2 of a starting symbol of the SSB has a value of the following expression: Y2=[(16×P)+(4×m)] or [(22×P)+(4×m)], where m is any integer from 0 to (P−1).

Example 7 includes the method of any of examples 1 to 7 or some other example herein, wherein each of the first plurality of SSBs and the second plurality of SSBs includes eight or more SSBs.

Example 8 includes the method of any of examples 1 to 7 or some other example herein, further comprising transmitting an indication that at least two SSBs among the first plurality of SSBs and the second plurality of SSBs have a same Quasi-Co-Location (QCL) state.

Example 9 includes a method of operating a UE, the method comprising receiving a group of SSBs, wherein at least two SSBs among the group of SSBs have a same QCL state, the at least two SSBs being adjacent in a time domain; receiving an information element that includes a value that indicates a number of the at least two SSBs among the group of SSBs that have the same QCL state; and coherently combining a synchronization sequence from a first of the at least two SSBs with a synchronization sequence from a second of the at least two SSBs.

Example 10 includes the method of example 9 or some other example herein, wherein the information element is a ServingCellConfigCommonSIB information element, and wherein the method further comprises receiving a System Information Block 1 (SIB1) message that includes the ServingCellConfigCommonSIB information element.

Example 11 includes the method of example 9 or some other example herein, wherein the information element is a ServingCellConfigCommon information element.

Example 12 includes the method of any of examples 9 to 11 or some other example herein, wherein the information element indicates that the same QCL state comprises QCL Type A and QCL Type D.

Example 13 includes the method of example 9 or some other example herein, wherein the coherent combining comprises cross-correlating the synchronization sequence from the first of the at least two SSBs with a first known sequence to obtain a first cross-correlation result; cross-correlating the synchronization sequence from the second of the at least two SSBs with a second known sequence to obtain a second cross-correlation result; and combining the first cross-correlation result with the second cross-correlation result to obtain a combined result.

Example 14 includes the method of example 13 or some other example herein, wherein the first cross-correlation result and the second cross-correlation result are correlation peaks, and wherein the method further comprises comparing the combined result to a threshold value.

Example 15 includes the method of any of examples 13 to 14 or some other example herein, wherein both of the synchronization sequence from the first of the at least two SSBs and the synchronization sequence from a second of the at least two SSBs are Primary Synchronization Sequences, or wherein both of the synchronization sequence from the first of the at least two SSBs and the synchronization sequence from a second of the at least two SSBs are Secondary Synchronization Sequences.

Example 16 includes the method of example 9 or some other example herein, the method further comprising receiving, in a Physical Broadcast Channel (PBCH), a first value that indicates a maximum number of SSBs having a same QCL state; and a second value that indicates a maximum number of SSBs to be transmitted within a Discovery Reference Signal (DRS) transmission window.

Example 17 includes the method of example 9 or some other example herein, the method further comprises monitoring a first Control Resource Set 0/Search Space 0 (CORESET0/SS0) instance that is associated with a first SSB of the at least two SSBs and a second SSB of the at least two SSBs that is not the first SSB.

Example 18 includes the method of example 17 or some other example herein, the method further comprises monitoring a second Control Resource Set 0/Search Space 0 (CORESET0/SS0) instance that is associated with a third SSB of the at least two SSBs that is not the first SSB and is not the second SSB.

Example 19 includes the method of example 18 or some other example herein, the method further comprises transmitting an indication of UE capability to monitor the second CORESET0/SS0 instance.

Example 20 includes the method of example 18 or some other example herein, the method further comprises monitoring the second CORESET0/SS0 instance in response to a configuration received via at least one among Radio Resource Control (RRC) or Medium Access Control-Control Element (MAC-CE).

Example 21 includes a method of operating a UE, the method comprising receiving, with a subcarrier spacing (SCS) of S kHz, a first plurality of synchronization signal blocks (SSBs) on a first set of consecutive symbols and a second plurality of SSBs on a second set of consecutive symbols, wherein S has a value of 480 or 960; and transmitting, between the transmission of the first plurality of SSBs and the transmission of the second plurality of SSBs, an uplink data transmission using a 960 kHz SCS.

Example 22 includes the method of example 21 or some other example herein, wherein each SSB of the first plurality of SSBs and each SSB of the second plurality of SSBs has a duration of four symbols.

Example 23 includes the method of example 21 or some other example herein, wherein the first plurality of SSBs and the second plurality of SSBs occur in a bandwidth part other than an initial downlink bandwidth part.

Example 24 includes the method of example 21 or some other example herein, wherein the receiving the first plurality of SSBs and the receiving the second plurality of SSBs occur within an ordered time sequence of R consecutive symbols, and wherein R has a value of ($112 \times P$), where P has a value of ($S/480$) and each symbol in the ordered time sequence is indexed from 0 to ($R-1$), and wherein, for each SSB of the first plurality of SSBs, an index Y1 of a starting symbol of the SSB has a value of the following expression: $Y1=(16 \times P)+(4 \times m)$, and wherein, for each SSB of the second plurality of SSBs, an index Y2 of a starting symbol of the SSB has a value of the following expression: $Y2=(64 \times P)+(4 \times m)$, where m is any integer from 0 to $[(8 \times P)-1]$.

Example 25 includes the method of example 21 or some other example herein, wherein the reception of the first plurality of SSBs and the reception of the second plurality of SSBs occur within an ordered time sequence of R consecutive symbols, and wherein R has a value of ($28 \times P$), where P has a value of ($S/480$) and each symbol in the ordered time sequence is indexed from 0 to ($R-1$), and wherein, for each SSB of the first plurality of SSBs, an index Y1 of a starting symbol of the SSB has a value of the following expression: $Y1=(4 \times P)+(4 \times m)$, and wherein, for each SSB of the second plurality of SSBs, an index Y2 of a starting symbol of the SSB has a value of the following expression: $Y2=(16 \times P)+(4 \times m)$, where m is any integer from 0 to $[(2 \times P)-1]$.

Example 26 includes the method of example 21 or some other example herein, wherein the reception of the first plurality of SSBs and the reception of the second plurality of SSBs occur within an ordered time sequence of R consecutive symbols, and wherein R has a value of ($28 \times P$), where P has a value of ($S/480$) and each symbol in the ordered time sequence is indexed from 0 to ($R-1$), and wherein, for each SSB of the first plurality of SSBs, an index Y1 of a starting symbol of the SSB has a value of the following expression: $Y1=[(2 \times P)+(4 \times m)]$ or $[(8 \times P)+(4 \times m)]$, and wherein, for each SSB of the second plurality of SSBs, an index Y2 of a starting symbol of the SSB has a value of the following expression: $Y2=[(16 \times P)+(4 \times m)]$ or $[(22 \times P)+(4 \times m)]$, where m is any integer from 0 to (P-1).

Example 27 includes the method of example 21 or some other example herein, wherein each of the first plurality of SSBs and the second plurality of SSBs includes eight or more SSBs.

Example 28 includes a method of operating an access node, the method comprising transmitting a group of synchronization signal blocks (SSBs), wherein at least two SSBs among the group of SSBs have a same Quasi-Co-Location (QCL) state, the at least two SSBs being adjacent in a time domain; and transmitting an information element that includes a value that indicates a number of the at least two SSBs among the group of SSBs that have the same QCL state.

Example 29 includes the method of example 28 or some other example herein, wherein the information element is a ServingCellConfigCommonSIB information element, and wherein the method further comprises receiving a System Information Block 1 (SIB1) message that includes the ServingCellConfigCommonSIB information element.

Example 30 includes the method of example 28 or some other example herein, wherein the information element is a ServingCellConfigCommon information element.

Example 31 includes the method of any of examples 28 to 30 or some other example herein, wherein the information element indicates that the same QCL state comprises QCL Type A and QCL Type D.

Example 32 may include an apparatus comprising means to perform one or more elements of a method described in or related to any of examples 1-31, or any other method or process described herein.

Example 33 may include one or more non-transitory computer-readable media comprising instructions to cause an electronic device, upon execution of the instructions by one or more processors of the electronic device, to perform one or more elements of a method described in or related to any of examples 1-31, or any other method or process described herein.

Example 34 may include an apparatus comprising logic, modules, or circuitry to perform one or more elements of a method described in or related to any of examples 1-31, or any other method or process described herein.

Example 35 may include a method, technique, or process as described in or related to any of examples 1-31, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of examples 1-31, or portions thereof.

Example 37 may include a signal as described in or related to any of examples 1-31, or portions or parts thereof.

Example 38 may include a datagram, information element, packet, frame, segment, PDU, or message as described in or related to any of examples 1-31, or portions or parts thereof, or otherwise described in the present disclosure.

Example 39 may include a signal encoded with data as described in or related to any of examples 1-31, or portions or parts thereof, or otherwise described in the present disclosure.

Example 40 may include a signal encoded with a datagram, IE, packet, frame, segment, PDU, or message as described in or related to any of examples 1-31, or portions or parts thereof, or otherwise described in the present disclosure.

Example 41 may include an electromagnetic signal carrying computer-readable instructions, wherein execution of the computer-readable instructions by one or more processors is to cause the one or more processors to perform the method, techniques, or process as described in or related to any of examples 1-31, or portions thereof.

Example 42 may include a computer program comprising instructions, wherein execution of the program by a processing element is to cause the processing element to carry out the method, techniques, or process as described in or related to any of examples 1-31, or portions thereof.

Example 43 may include a signal in a wireless network as shown and described herein.

Example 44 may include a method of communicating in a wireless network as shown and described herein.

Example 45 may include a system for providing wireless communication as shown and described herein.

Example 46 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media, having instructions that, when executed, cause processing circuitry to:

generate, with a subcarrier spacing (SCS) of S kHz, a first plurality of synchronization signal blocks (SSBs) for transmission on a first set of consecutive symbols and a second plurality of SSBs for transmission on a second set of consecutive symbols, wherein S has a value of 480 or 960; and processing an uplink data transmission using a 960 kHz SCS, wherein the uplink data transmission is received between a transmission of the first plurality of SSBs and a transmission of the second plurality of SSBs; and wherein the transmission of the first plurality of SSBs and the transmission of the second plurality of SSBs occur within an ordered time sequence of R consecutive symbols, and wherein:

R has a value of $(112 \times P)$, where P has a value of $(S/480)$ and each symbol in the ordered time sequence is indexed from 0 to $(R-1)$, and, for each SSB of the first plurality of SSBs, an index Y1 of a starting symbol of the SSB has a value of the following expression: $Y1=(16 \times P)+ (4 \times m)$, and, for each SSB of the second plurality of SSBs, an index Y2 of a starting symbol of the SSB has a value of the following expression: $Y2=(64 \times P)+ (4 \times m)$, where m is any integer from 0 to $[(8 \times P)-1]$;

R has a value of $(28 \times P)$, where P has a value of $(S/480)$ and each symbol in the ordered time sequence is indexed from 0 to $(R-1)$, and, for each SSB of the first plurality of SSBs, an index Y1 of a starting symbol of the SSB has a value of the following expression: $Y1=(4 \times P)+ (4 \times m)$, and, for each SSB of the second plurality of SSBs, an index Y2 of a starting symbol of the SSB has a value of the following expression: $Y2=(16 \times P)+ (4 \times m)$, where m is any integer from 0 to $[(2 \times P)-1]$; or R has a value of $(28 \times P)$, where P has a value of $(S/480)$ and each symbol in the ordered time sequence is indexed from 0 to $(R-1)$, and, for each SSB of the first plurality of SSBs, an index Y1 of a starting symbol of the SSB has a value of the following expression: Y1=[(2×P)+ (4×m)] or [(8×P)+ (4×m)], and, for each SSB of the second plurality of SSBs, an index Y2 of a starting symbol of the SSB has a value of the following expression: Y2=[(16×P)+ (4×m)] or [(22×P)+ (4×m)], where m is any integer from 0 to (P−1).

2. The one or more non-transitory computer-readable media of claim 1, wherein each SSB of the first plurality of SSBs and each SSB of the second plurality of SSBs has a duration of four symbols.

3. The one or more non-transitory computer-readable media of claim 1, wherein the first plurality of SSBs and the second plurality of SSBs occur in a bandwidth part other than an initial downlink bandwidth part.

4. The one or more non-transitory computer-readable media of claim 1, wherein S has a value of 480 and each of the first plurality of SSBs and the second plurality of SSBs includes eight or more SSBs.

5. The one or more non-transitory computer-readable media of claim 1, wherein the instructions, when executed, cause the processing circuitry further to:
generate an indication that at least two SSBs among the first plurality of SSBs and the second plurality of SSBs have a same Quasi-Co-Location (QCL) state.

6. A method comprising:
processing, with a subcarrier spacing (SCS) of S kHz, a first plurality of synchronization signal blocks (SSBs) received on a first set of consecutive symbols and a second plurality of SSBs received on a second set of consecutive symbols, wherein S has a value of 480 or 960; and
generating an uplink data transmission using a 960 kHz SCS, wherein the uplink data transmission is transmitted between reception of the first plurality of SSBs and reception of the second plurality of SSBs; and
wherein the reception of the first plurality of SSBs and the reception of the second plurality of SSBs occur within an ordered time sequence of R consecutive symbols, and wherein:
R has a value of (112×P), where P has a value of (S/480), and each symbol in the ordered time sequence is indexed from 0 to (R−1), and, for each SSB of the first plurality of SSBs, an index Y1 of a starting symbol of the SSB has a value of the following expression: Y1=(16×P)+ (4×m), and, for each SSB of the second plurality of SSBs, an index Y2 of a starting symbol of the SSB has a value of the following expression: Y2=(64×P)+ (4×m), where m is any integer from 0 to [(8×P)−1];

R has a value of (28×P), where P has a value of (S/480) and each symbol in the ordered time sequence is indexed from 0 to (R−1), and, for each SSB of the first plurality of SSBs, an index Y1 of a starting symbol of the SSB has a value of the following expression: Y1=(4×P)+ (4×m), and, for each SSB of the second plurality of SSBs, an index Y2 of a starting symbol of the SSB has a value of the following expression: Y2=(16×P)+ (4×m), where m is any integer from 0 to [(2×P)−1]; or R has a value of (28×P), where P has a value of (S/480) and each symbol in the ordered time sequence is indexed from 0 to (R−1), and, for each SSB of the first plurality of SSBs, an index Y1 of a starting symbol of the SSB has a value of the following expression: Y1=[(2×P)+ (4×m)] or [(8×P)+ (4×m)], and, for each SSB of the second plurality of SSBs, an index Y2 of a starting symbol of the SSB has a value of the following expression: Y2=/(16×P)+(4×m)] or [(22×P)+ (4×m)], where m is any integer from 0 to (P−1).

7. The method of claim 6, wherein each SSB of the first plurality of SSBs and each SSB of the second plurality of SSBs has a duration of four symbols.

8. The method of claim 6, wherein the first plurality of SSBs and the second plurality of SSBs occur in a bandwidth part other than an initial downlink bandwidth part.

9. The method of claim 6, wherein S has a value of 480 and each of the first plurality of SSBs and the second plurality of SSBs includes eight or more SSBs.

10. The method of claim 6, further comprising:
processing an indication that at least two SSBs among the first plurality of SSBs and the second plurality of SSBs have a same Quasi-Co-Location (QCL) state.

\* \* \* \* \*